US011314832B1

(12) United States Patent
Unger et al.

(10) Patent No.: US 11,314,832 B1
(45) Date of Patent: Apr. 26, 2022

(54) ELECTRONIC PRODUCT INFORMATION MANAGER

(71) Applicant: TARGET BRANDS, INC., Minneapolis, MN (US)

(72) Inventors: Jamie Lois Marschel Unger, Wyoming, MN (US); Robyn Nicole Dillon, Eden Prairie, MN (US); Matthew Gutierrez Haugen, Minneapolis, MN (US); Emily Anne Lyman, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 207 days.

(21) Appl. No.: 16/369,746

(22) Filed: Mar. 29, 2019

Related U.S. Application Data

(60) Provisional application No. 62/649,697, filed on Mar. 29, 2018.

(51) Int. Cl.
*G06F 16/9538* (2019.01)
*G06Q 30/06* (2012.01)
*G06F 16/9535* (2019.01)
*G06F 16/9532* (2019.01)

(52) U.S. Cl.
CPC ...... *G06F 16/9538* (2019.01); *G06F 16/9532* (2019.01); *G06F 16/9535* (2019.01); *G06Q 30/0643* (2013.01)

(58) Field of Classification Search
CPC ............ G06F 16/9538; G06F 16/9532; G06F 16/9535
USPC ....................................................... 707/707
See application file for complete search history.

(56) References Cited

U.S. PATENT DOCUMENTS

| | | | |
|---|---|---|---|
| 6,751,600 B1 | 6/2004 | Wolin | |
| 7,966,369 B1* | 6/2011 | Briere | G06F 16/248 709/204 |
| 8,285,608 B2 | 10/2012 | Brown et al. | |
| 8,463,658 B2* | 6/2013 | Racco | G06Q 30/0601 705/26.1 |
| 8,645,431 B2 | 2/2014 | Wong et al. | |
| 8,671,031 B2 | 3/2014 | Henderson et al. | |

(Continued)

OTHER PUBLICATIONS

CSS Tooltip available at https://www.w3schools.com/css/css_tooltip.asp.*

*Primary Examiner* — Ashish Thomas
*Assistant Examiner* — Abdullah A Daud
(74) *Attorney, Agent, or Firm* — Hamre, Schumann, Mueller & Larson, P.C.

(57) ABSTRACT

A system including a GUI displayed on a display device is disclosed. The GUI includes a website that, when loaded onto a user device, permits the user device to communicate with at least one server to send to the at least one server item information to electronically manage one or more items in a product information database, to receive from the at least one server item information from the product information database, and to cause display of the item information received. The at least one server is remote from the user device on which the website is loaded and that is able to communicate with the user device. The at least one server is configured to receive the item information about the one or more items from the product information database, update the item information in the product information database, and send the item information to the website.

15 Claims, 9 Drawing Sheets

(56) References Cited

U.S. PATENT DOCUMENTS

| | | | |
|---|---|---|---|
| 2002/0032612 A1* | 3/2002 | Williams | G06Q 30/0601 |
| | | | 705/26.1 |
| 2002/0073125 A1* | 6/2002 | Bier | G06F 40/166 |
| | | | 715/255 |
| 2003/0033179 A1 | 2/2003 | Katz et al. | |
| 2005/0080638 A1* | 4/2005 | Maseruka | G06Q 10/08 |
| | | | 705/26.1 |
| 2008/0133589 A1* | 6/2008 | Nickerson | G06Q 10/087 |
| 2008/0183634 A1 | 7/2008 | Badler | |
| 2008/0262940 A1 | 10/2008 | Kovach | |
| 2009/0012813 A1* | 1/2009 | Berzansky | G16H 10/60 |
| | | | 705/2 |
| 2009/0259505 A1 | 10/2009 | Tadayon | |
| 2010/0333031 A1 | 12/2010 | Castelli et al. | |
| 2011/0173088 A1* | 7/2011 | Stone | G06Q 30/0621 |
| | | | 705/26.5 |
| 2013/0018696 A1 | 1/2013 | Meldrum | |
| 2014/0200938 A1* | 7/2014 | Aprin | G06Q 40/02 |
| | | | 705/7.14 |
| 2014/0279294 A1* | 9/2014 | Field-Darragh | H04B 5/0062 |
| | | | 705/28 |
| 2015/0120495 A1* | 4/2015 | Kumar | G06Q 30/0633 |
| | | | 705/26.8 |
| 2016/0098672 A1 | 4/2016 | Kondragunta et al. | |
| 2017/0032310 A1 | 2/2017 | Mimnaugh et al. | |
| 2017/0206547 A1 | 7/2017 | Vise et al. | |
| 2017/0255986 A1* | 9/2017 | Herbst | G06Q 30/0282 |
| 2018/0115892 A1* | 4/2018 | Kotay | H04W 12/04 |
| 2018/0181908 A1* | 6/2018 | Jones | G06K 7/10366 |
| 2019/0149887 A1* | 5/2019 | Williams | G06F 3/04817 |
| | | | 725/52 |

* cited by examiner

ELECTRONIC PRODUCT INFORMATION MANAGER

FIELD

This disclosure relates generally to the field of graphical user interfaces for electronically managing product information of a retailer, such as but not limited to, applicable information about what a product looks like, what the product is made of, how the product will be shipped, and other classifying information.

BACKGROUND

Consumers purchase products in retail stores and via retail websites accessible from the Internet. Shopping via a retail website allows consumers to interact with text, pictures, videos, and/or audio clips relating to the products the consumer is contemplating purchasing. Often, shopping via the retail website allows the consumer to read reviews by other consumers, search for related products, and search for products that other consumers bought at the same time, or the like.

Improved ways to manage product information of the retailer are desirable.

SUMMARY

This disclosure relates generally to the field of graphical user interfaces for electronically managing product information of a retailer, such as but not limited to, applicable information about what a product looks like, what the product is made of, how the product will be shipped, and other classifying information.

This disclosure relates generally to the field of graphical user interfaces for electronically managing product information of a retailer, such as one or more items available for purchase (e.g., from the retailer via a website of the retailer or via a store of the retailer) and one or more items not available for purchase.

A system comprising a graphical user interface (GUI) displayed on a display device is disclosed. The GUI includes a website that is loadable onto a user device having the display device and an input device. When loaded onto the user device, the website permits the user device to communicate with at least one server to send to the at least one server item information to electronically manage one or more items in a product information database, to receive from the at least one server item information from the product information database, and to cause display of the item information received from the product information database. The at least one server is remote from the user device on which the website is loaded and that is able to communicate with the user device. The at least one server is configured to receive the item information about the one or more items from the product information database, update the item information in the product information database, and send the item information to the website.

An Internet website system is disclosed. The Internet website system includes at least one server that is connectable to the Internet and that is configured to provide a website that is viewable on the Internet. The website displays a plurality of saved searches in rows and columns. Each of the plurality of searches includes an identifier, a plurality of statuses, and a total number of results. Each of the plurality of statuses is shown including a percentage of the total number of results corresponding to the status. Each of the plurality of statuses is selectable so that the saved search and corresponding status is shown in response to selection of the status.

In an embodiment, the electronic product information manager can reduce an amount of time taken to electronically manage one or more items so that the one or more items are ready for sale by a retailer.

In an embodiment, the electronic product information manager can replace a manual completion of information about each item in the assortment and automatically populate information across a plurality of items in the assortment when the items have related information. In an embodiment this can, for example, reduce an amount of time to make an item available for sale by the retailer.

In an embodiment, the GUI of the electronic product information manager can automatically save and validate information entered into the GUI so that a number of clicks are reduced for the user and a likelihood of incorrect data being entered can be reduced.

Unless otherwise defined by the Applicant, a button, as used in this specification, is not intended to include a particular structure. A button can generally include an area that is selectable and which can, for example, include a hyperlink or the like to cause a display change to a GUI. It will be appreciated that a button can alternatively be implemented as a hyperlink or the like.

Unless otherwise defined by the Applicant, an item, as used in this specification, includes any item available for purchase from a retailer (e.g., via the retailer's website or via the retailer's store in instances in which the retailer also has a retail store) and any item not available for purchase from the retailer that may be relevant to the one or more items for purchase. For example, the one or more items can include a store display that is utilized to display the one or more items that are available for purchase.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

This disclosure relates generally to the field of graphical user interfaces for electronically managing product information of a retailer, such as but not limited to, applicable information about what a product looks like, what the product is made of, how the product will be shipped, and other classifying information.

A retailer generally maintains an electronic record of product information of items available for purchase and items related to those available for purchase. Employees of the retailer may electronically manage the electronic product information of items in conjunction with a plurality of vendors that provide the items to the retailer for sale. For example, an employee or other representative of the retailer may electronically manage one or more aspects of the product information, while an employee or representative of a vendor may electronically manage one or more aspects (including either the same or different aspects than managed by the employee) of the product information. The retailer and the vendor generally work in conjunction to ensure that the electronic product information of items available for purchase is correctly maintained. The retailer may sell thousands or millions of items from hundreds or thousands of vendors.

Currently, a plurality of systems including a variety of different user interfaces may be utilized to electronically manage the product information for items of the retailer. Further, the data management is often completed in a spreadsheet that is shared between the various vendors and the employees of the retailer. These spreadsheets can include thousands of rows, and may be very tedious and time-consuming to electronically manage.

It is desirable to have a GUI in which the retailer and the vendor can electronically interact and maintain information about the items available from the retailer. Systems and methods described in this specification are directed to a GUI via which the retailer and the vendor can efficiently interact and electronically manage the product information.

In an embodiment, the electronic product information management system can be implemented as a website that is accessible via a network such as the Internet. In an embodiment, the website can be owned, operated, or controlled, along with combinations thereof, by a retail company.

Figure 1:
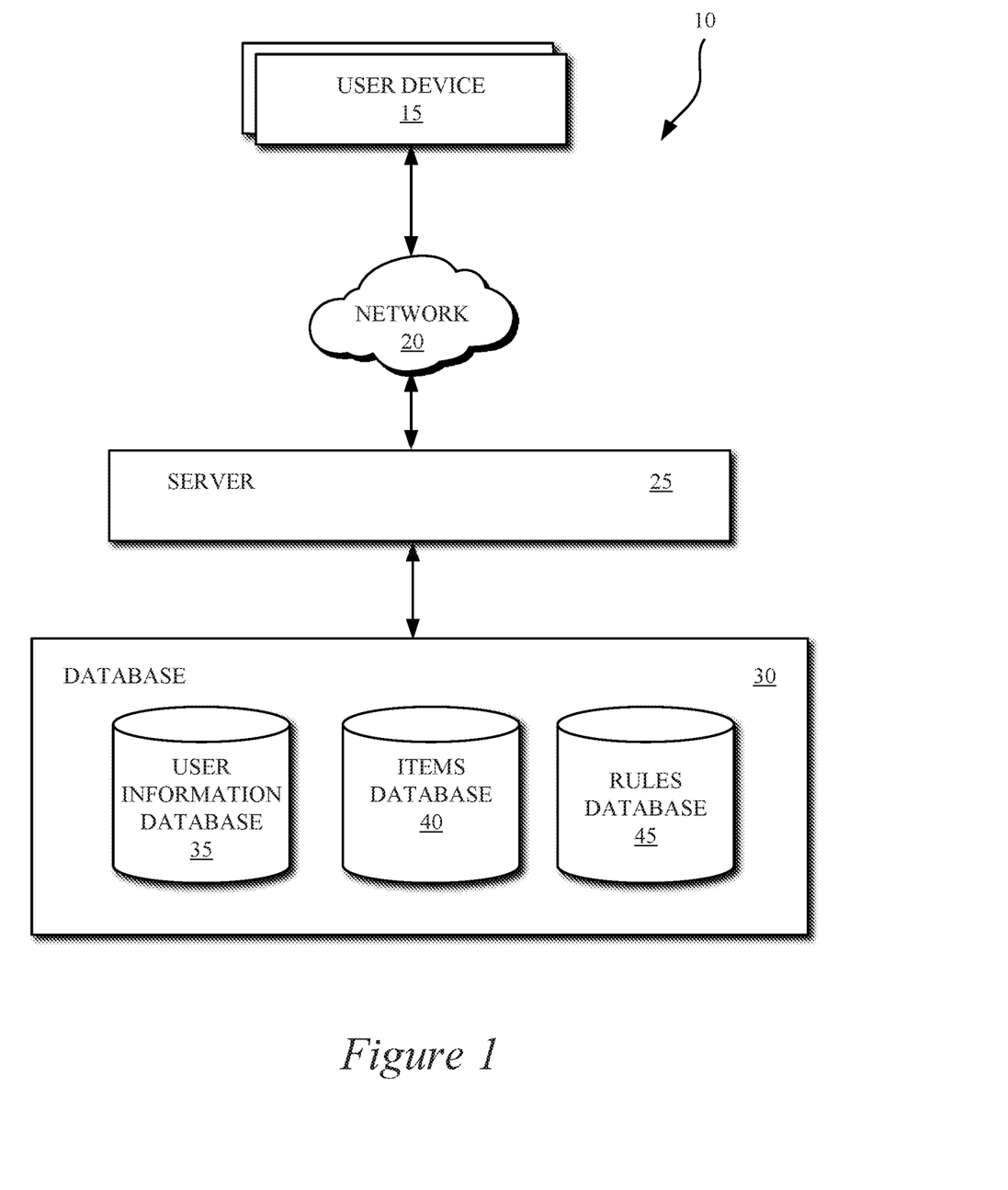
FIG. 1 is a schematic diagram of a system for implementing the electronic product information management systems and methods described in this specification, according to an embodiment.

FIG. 1 is a schematic diagram of a system 10 for implementing the electronic product information management systems and methods described in this specification, according to an embodiment. The system 10 can be used to provide a graphical user interface (GUI) to a user device (e.g., user device 15) so that the user can electronically manage information about one or more items.

The system 10 includes a server 25 in communication with a plurality of user devices 15 via a network 20. The server 25 can make a website or other GUI available to the user devices 15. An example of the website or other GUI is shown and described in accordance with FIGS. 2A-4 below. The server 25 can make the website or other user interface of the electronic product information management system as described in this specification available to the user devices 15 via the network 20. In an embodiment, the website or other GUI can enable a user to electronically maintain information about one or more items on the user device 15 via the network 20.

It will be appreciated that the website or other GUI may be made available by one or more servers that are physically separate, but electronically connected, with the server 25, such as a distributed network of servers. Aspects of the server 25 can be the same as or similar to aspects of the server device 535 shown and described in accordance with FIG. 5 below.

The network 20 may be representative of the Internet, according to an embodiment. In an embodiment, the network 20 can include a local area network (LAN), a wide area network (WAN), a wireless network, a cellular data network, suitable combinations thereof, or the like. Aspects of the network 20 can be the same as or similar to aspects of the network 540 as shown and described in accordance with FIG. 5 below.

Examples of the user devices 15 include, but are not limited to, a personal computer (PC), a laptop computer, a mobile device (e.g., a smartphone, a personal digital assistant (PDA), a tablet-style device, etc.), a wearable mobile device (e.g., a smart watch, head wearable device, etc.), or the like. The user devices 15 generally include a display device and an input device. A GUI for the electronic product information management system can be displayed on the display device of the user device 15. Inputs regarding information associated with the one or more items in the electronic product information management system can be electronically entered via the input device of the user device 15. Examples of the display device for the user devices 15 include, but are not limited to, a monitor connected to a PC, a laptop screen, a mobile device screen, a tablet screen, a wearable mobile device screen, or the like. Examples of the input device for the user devices 15 include, but are not limited to, a keyboard, a mouse, a trackball, a button, a voice command, a proximity sensor, a touch sensor, an ocular sensing device for determining an input based on eye movements (e.g., scrolling based on an eye movement), combinations thereof, or the like. Aspects of the user devices 15 can be the same as or similar to aspects of the user devices 501 as shown and described in accordance with FIG. 5 below.

In an embodiment, the user devices 15 may be able to access the server 25 so long as the user device is authenticated via the user device. In an embodiment, the user can be authenticated via a secure network. For example, if the user is logged into a secure network using, for example, the user's credentials as an employee, (e.g., a Single Sign On (SSO)), the user can have access to the server 25 and correspondingly to a database 30. In an embodiment, the user can log in to the user device 15 (and accordingly the secure network) with a username and password and access data in the system 10 regardless of location. For example, the user can be at home and have access to the system 10 as long as the user is logged in with her credentials and is connected to the secure network (e.g., via a virtual private network (VPN) or the like).

The server 25 is in electronic communication with the database 30. The database 30 can include a variety of information related to the electronic management of the items so that the items are moved from an unavailable status in which the items are not available for purchase by a customer of the retailer to an available status in which the items may be available for purchase by the customer of the retailer. In an embodiment, the database 30 can include, for example, a user information database 35, an items database 40, and a rules database 45. It will be appreciated that these databases are examples. Additional databases can be included. One or more of the databases can be combined.

The user information database 35 can include details about various users of the system 10. For example, the user information database 35 can include username and password information for a user, as well as permissions for the user. In an embodiment, the permissions can be based, for example, on whether the user is an employee of the retailer or a vendor looking to sell items via the retailer. The permissions can determine which fields of information relating to the items are displayed to the user in the GUIs shown and described in accordance with FIGS. 2A-4.

The item database 40 can include item information about the items of the retailer. In an embodiment, the items database 40 can include item information such as, but not limited to, an item identification number, a barcode associated with the item, whether the item is available for purchase or is related to an item available for purchase, identifying information about the item such as a brand, a title, or the like. In an embodiment, the items database 40 can include information about a status of the items relative to moving from a state in which the items are unavailable for purchase to a state in which the items are available for purchase. The items database 40 can include a listing of tasks requested or required for moving the item toward purchase. For example, the item status can be based on whether a particular entity needs to take further action, what the further action is, or the like. This listing of information about the items in the items database 40 is an example. It will be appreciated that the item database 40 can include fewer pieces of information or additional pieces of information.

The rules database 45 can include one or more rules relating to the management of the items in the item database 40. For example, in an embodiment, the rules database 45 can include validation rules that are utilized to ensure that data entered via the GUIs of the system 10 includes proper information.

The database 30 can include additional information such as, but not limited to, a user history database, a session history database, or the like.

The database 30 and the corresponding components (e.g., user information database 35, item database 40, and rule database 45, etc.) are not intended to reflect a particular database format or structure. For example, one or more of the databases 35-45 can be combined. Accordingly, the structure of the database 30 is not intended to be limited to the illustrated embodiment.

Figure 2A:
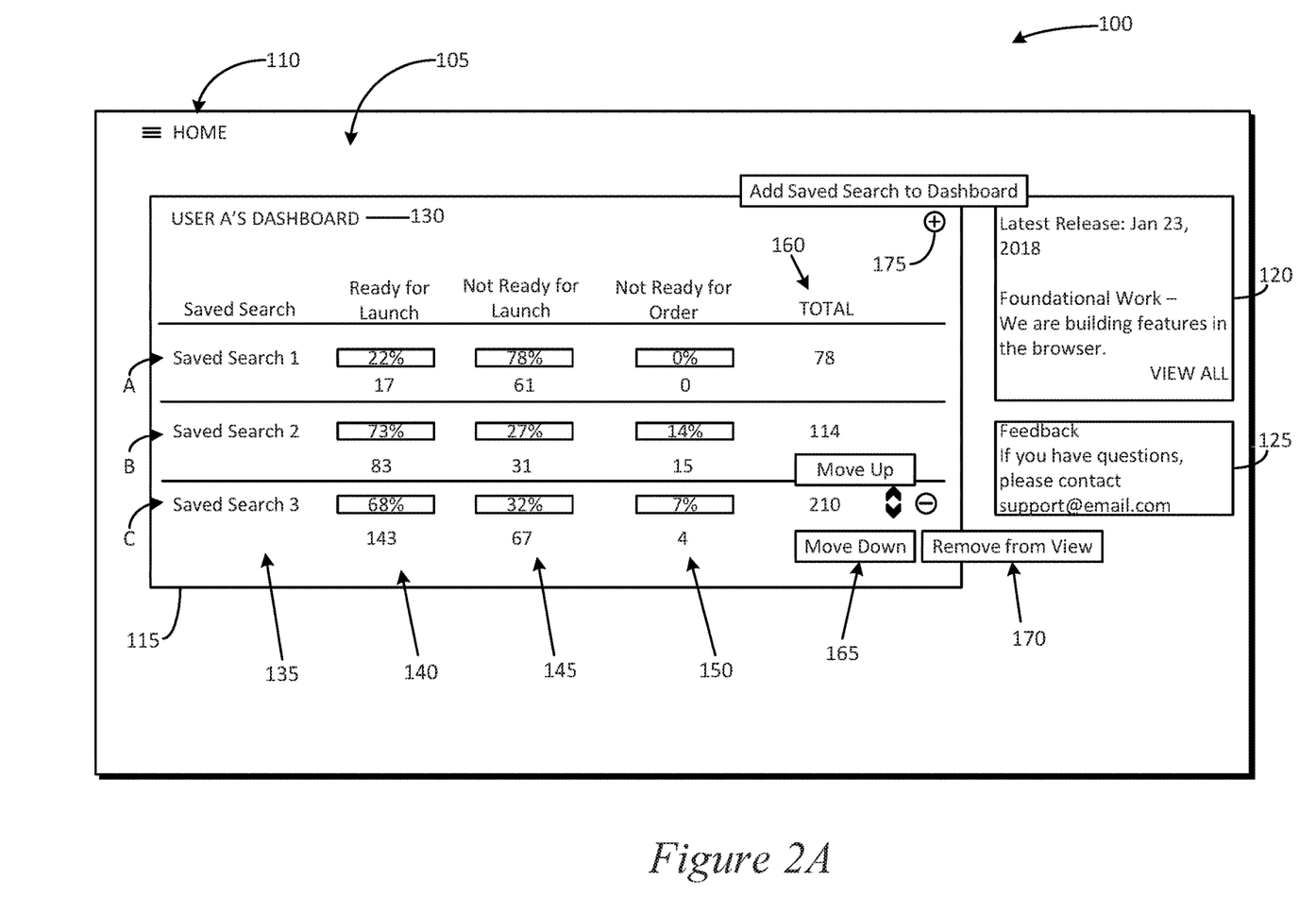
FIG. 2A is a schematic diagram of an example of a GUI showing a dashboard user interface, according to an embodiment.

FIG. 2A is a schematic diagram of an example of a GUI 100 showing a dashboard user interface, according to an embodiment. It will be appreciated that the text and images shown in the illustrated embodiment are intended as examples and that the text and images can vary according to the principles described in this specification.

The GUI 100 may generally be representative of a user interface which is first presented to a user of the electronic product information management system (e.g., system 10 in FIG. 1), according to an embodiment. Accordingly, the GUI 100 may alternatively be referred to as a landing page, home page, or the like.

The GUI 100 includes a header 105 having a menu 110. The menu 110 may be selectable to show a larger menu for navigating to other GUIs or completing administrative tasks such as changing a password, changing profile information, logging out of the system, or the like. In an embodiment, the menu 110 can include options for beginning an electronic messaging feature. It will be appreciated that the electronic messaging feature may be accessible through other locations within the GUI 100. The electronic messaging feature can be, for example, similar to an email system and provide the user the ability to send and receive electronic messages from other users. In an embodiment, the electronic messaging feature can be an instant messaging feature so that the user can send and receive electronic messages with the other users in real time.

The GUI 100 includes a first panel 115, a second panel 120, and a third panel 125. It will be appreciated that the number of panels may vary beyond three. Further, in an embodiment, the panels 115, 120, 125 may not include a visible border. A panel includes an area of the GUI, and, as used in this specification, is not intended to require a particular structure or design.

In the illustrated embodiment, the first panel 115 shows saved searches for a particular user related to her work in electronically managing product information via the system 10 (FIG. 1). The first panel 115 includes title text 130 and a table including information arranged in rows A, B, C and columns 135-160. Three rows A-C are shown in the illustrated embodiment, but it will be appreciated that the number of rows displayed can vary. In an embodiment, there may be a maximum number of rows that are displayed for simplicity of the GUI 100. However, in another embodiment, there may be no limit to the number of rows that are displayed, and a user may be able to scroll when the number of rows exceeds an amount of information that can be displayed to the user at one time.

Column 135 can include identifying information, such as a title or short descriptive phrase, for the saved search. Columns 140-150 can represent various statuses associated with the items being electronically managed by the user. For example, the illustrated embodiment includes three statuses—"Ready for Launch," "Not Ready for Launch," and "Not Ready for Order." These three statuses represent statuses for items that are at different stages of the lifecycle in moving toward being available for purchase from the retailer. It will be appreciated that the particular statuses can vary. In an embodiment, there may be fewer than three or greater than three statuses, in which case the number of columns may be modified accordingly. In each of the columns 140-150, a status bar including a percentage of the total items and a number of items with that status are shown. Each of the percentages may be selectable so that the user may be forwarded to a search user interface (e.g., GUI 250 in FIG. 3A). When the user selects one of the columns 140-150, the subsequent display may be filtered according to the status selected. Column 160 is a "Total" column that identifies a total number of items (in any status) corresponding to the saved search for that row. In an embodiment, the total column may not be selectable. In an embodiment, the total column may be selectable so that the user may be forwarded to a search user interface (e.g., GUI 250 in FIG. 3A). When the user selects the column 160, the subsequent display may be filtered according to the status selected.

If the user hovers over one of the rows A-C in a location that is not selectable, then additional options may automatically be displayed on the GUI 100. In an embodiment, these additional options may include a rearrange button 165 or a remove button 170. Hovering can include, for example, a user moving a cursor to a location outside of the selectable region, hovering a finger, stylus, or the like, over a location outside of the selectable region, or the like. In an embodiment, when the rearrange button 165 is displayed or the remove button 170 is displayed, a textual indicator can automatically be displayed on the GUI 100. For example, a "Move Up" indicator, a "Move Down" indicator, or a combination thereof, can be displayed near the rearrange button 165 as shown in FIG. 2A. It will be appreciated that this additional display of text is optional. In an embodiment, "Remove from View" can automatically be displayed near the remove button 170 when the user hovers over the remove button 170. This additional display of text may be optional. The specific text is not intended to be limiting. The user can select the rearrange button 165 and drag the row (e.g., row C) to a desired location. Alternatively, the user can select the remove button 170 to have the row (e.g., row C) removed from the GUI 100. It will be appreciated that the rearrange button 165 and the remove button 170 can alternatively be displayed in row A or row B if the user hovers over one of these rows. In an embodiment, if the user selects the remove button 170, a popup message may optionally be presented so the user can confirm her intentions.

In an embodiment, the user can modify what is shown in the first panel 115 by selecting an add button 175. The add button 175 is shown as a plus indicator, but the actual appearance of the add button 175 can vary. In an embodiment, if the user hovers over the add button 175, an instruction such as "Add Saved Search to Dashboard" can optionally be displayed. If the user selects the add button 175, the user can select to add one or more rows to the first panel 115. In an embodiment, the user can create a new search to be included in the table after selecting the add button 175.

Figure 2B:
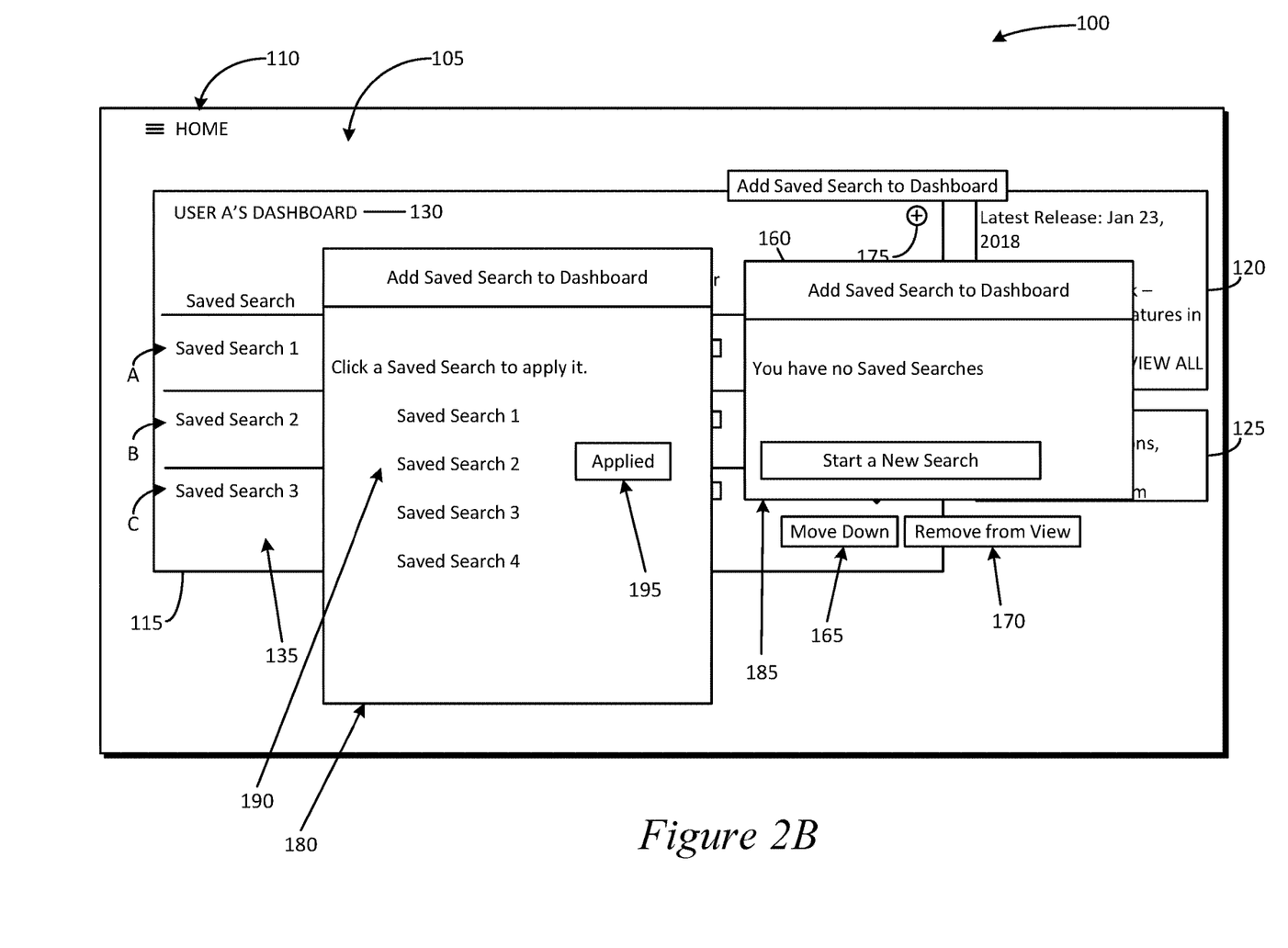
FIG. 2B is a schematic diagram of an example of the GUI of FIG. 2A showing the dashboard user interface including a popup message, according to an embodiment.

If the user selects the add button 175, the GUI 100 can be overlaid with one or more popup messages 180, 185, as shown in FIG. 2B. It will be appreciated that the text and images shown in the illustrated embodiment are intended as examples and that the text and images can vary according to the principles described in this specification.

The popup message 180 can include a plurality of saved search listings that can be inserted to the table in FIG. 2A. For example, in FIG. 2B, the saved search 190 may be included in the table in FIG. 2A, as shown by the graying of the text and the "Applied" indicator 195. Each of the other entries may be selectable. On selection, the entry would be grayed and the "Applied" indicator 195 added to the corresponding selection. Additionally, the selected entry would be displayed as another row in the first panel 115 in FIG. 2A.

In an embodiment, the popup message 180 may be shown when the user has saved searches, but not shown when the user does not have any saved searches. In an embodiment, the popup message 180 may be shown regardless of whether the user has saved searches. In such an embodiment, the popup message 180 may indicate when there are no saved searches by showing a message informing the user that she does not have any saved searches.

The popup message 185 can be used to add a search. In an embodiment, the popup message 185 may be shown when the user does not have any saved searches. In an embodiment, the popup message 185 may be shown even if the user has saved searches.

With further reference to FIG. 2A, the second panel 120 generally includes messages for the user. In an embodiment, the messages may be sorted by importance. In an embodiment, the messages may be sorted based on timing, so that, for example, an oldest message or a most recent message is displayed first, and the remaining messages are displayed chronologically subsequent to the first message. The second panel 120 can include a "View All" button so that the second panel 120 can be expanded to show the user all messages. In an embodiment, the "View All" button can take the user to another GUI instead of expanding the second panel 120.

The third panel 125 can be used to highlight contact information for support, such as, but not limited to, technical support. In an embodiment, the third panel 125 may be optional.

Figure 3A:
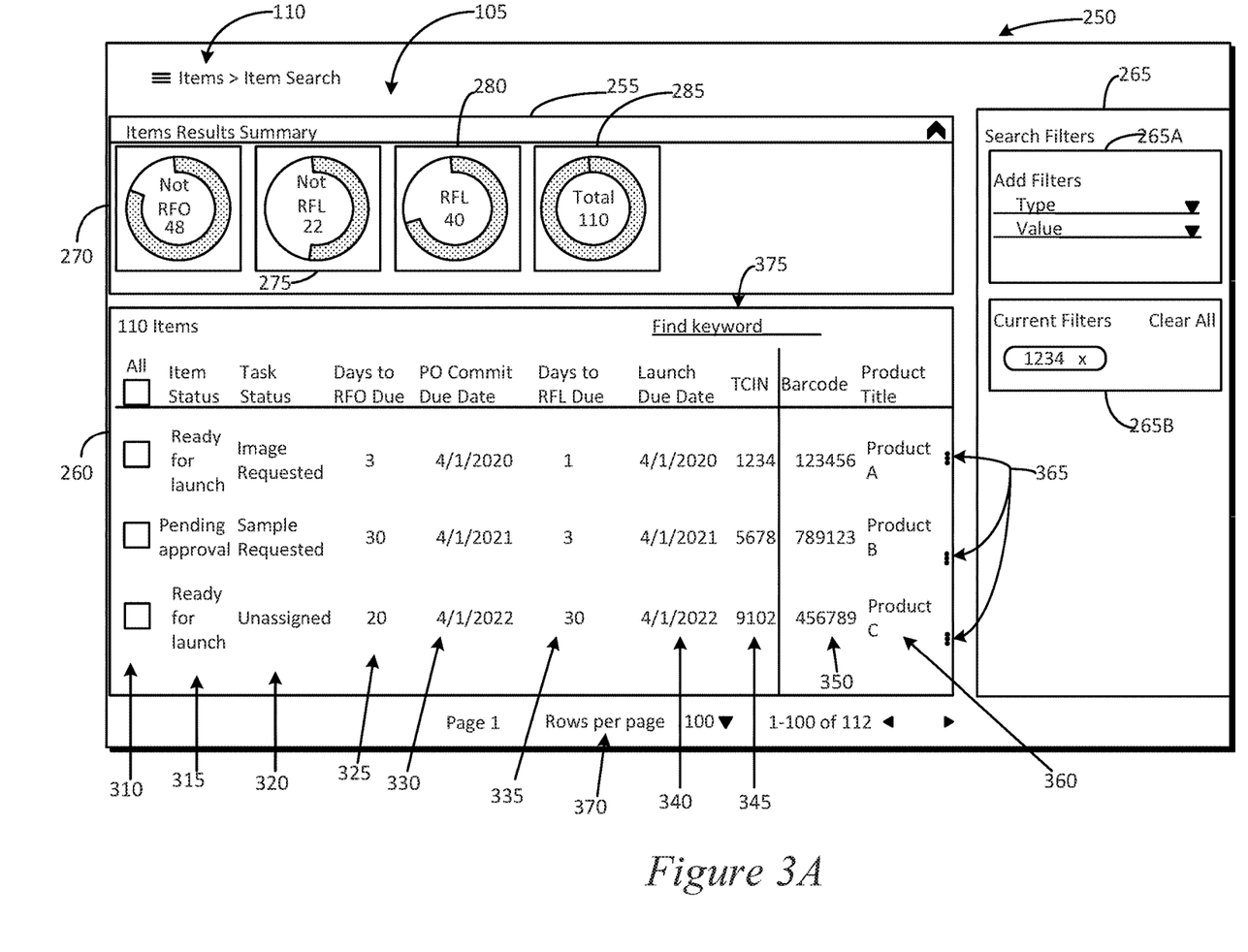
FIG. 3A is a schematic diagram of an example of a GUI showing a search user interface, according to an embodiment.

FIG. 3A is a schematic diagram of an example of a GUI 250 showing a search user interface, according to an embodiment. It will be appreciated that the text and images shown in the illustrated embodiment are intended as examples and that the text and images can vary according to the principles described in this specification.

The GUI 250 may generally be representative of a user interface which for searching for items the user is responsible for electronically managing using the electronic product information manager. Accordingly, in an embodiment, selecting one of the saved searches from the GUI 100 (FIG. 2A) can cause the display of the GUI 250.

The GUI 250 includes the header 105 having the menu 110. The header 105 may include different text than that shown in the GUI 100 (FIG. 2A). However, the look and feel and operation of the header 105 and the menu 110 are generally the same as described above with respect to FIG. 2A. For simplicity of this specification, these features will not be again described in further detail.

The GUI 250 includes a first panel 255, a second panel 260, and a third panel 265. It will be appreciated that the number of panels may vary beyond three. Further, in an embodiment, the panels 255, 260, 265 may not include a visible border.

The first panel 255 generally shows a summary of the item results based on the user's search. The summary of the item results may be broken down similarly (e.g., by status) to the breakdown in the table of the first panel 115 (FIG. 2A).

In the illustrated embodiment, the first panel 255 includes a plurality of indicators 270-285. The plurality of indicators 270-285 are shown in a form of pie indicators, with a fill of the indicator being based on a percentage of completion. It will be appreciated that the indicators 270-285 can be in a form other than pie indicators, such as a bar or the like. The various indicators may function according to the principles in this specification.

The indicators 270-285 are generally a visual representation of a status of items in a particular state. This can, for example, enable the user to easily view which areas need relatively more work than others. In an embodiment, the indicators can be selectable. For example, if the user selects the indicator 270, items shown in the second panel 260 may be limited to those having the selected item status. In the illustrated embodiment, the indicator 285 is selected and accordingly, the second panel 260 illustrates the 110 total items for the user. The status indicators 270-285 correspond to the statuses in columns 140-160 (FIG. 2A) shown in the first panel 115 (FIG. 2A). In an embodiment, as shown in FIGS. 3B-3D, various actions may occur when the user hovers over one of the indicators 270-285.

Figure 3B:
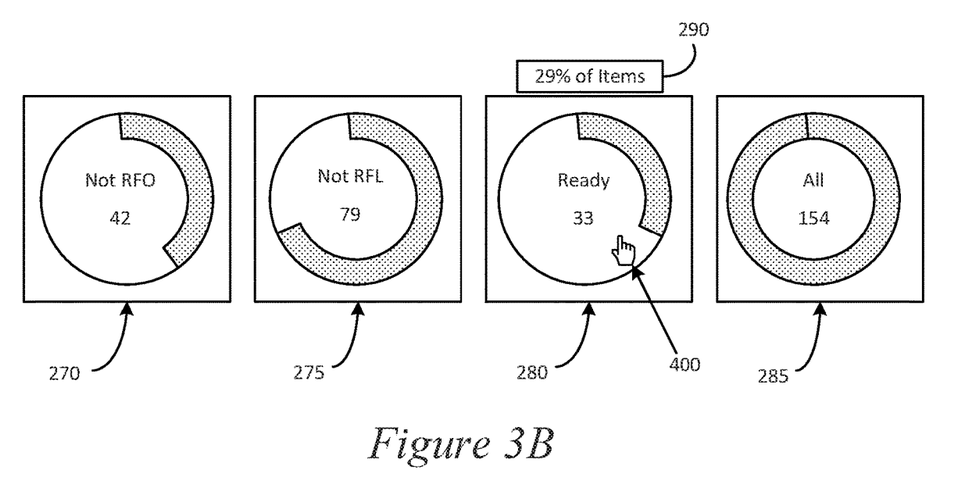
FIG. 3B is a schematic diagram of a portion of a first panel of the GUI in FIG. 3A, according to an embodiment.

FIG. 3B is a schematic of a portion of the first panel 255 (FIG. 3A) including the indicators 270-285, according to an embodiment. It will be appreciated that the text and images shown in the illustrated embodiment are intended as examples and that the text and images can vary according to the principles described in this specification. In FIG. 3B, a cursor 400 is shown overlaid on the indicator 280. In response to the cursor 400 hovering over the indicator 280, a message 290 is displayed. In the illustrated embodiment, the message 290 indicates that the 33 items that are ready for launch represent "29% of Items" for the user. In an embodiment, once the cursor 400 is moved away from the indicator 280, the message 290 can automatically be hidden from the display. Similarly, if the cursor 400 is moved over one of the other indicators 270 or 275, a similar message may be automatically displayed for the user. In an embodiment, if the cursor 400 is moved over the indicator 285, a message may not be displayed.

Figure 3C:
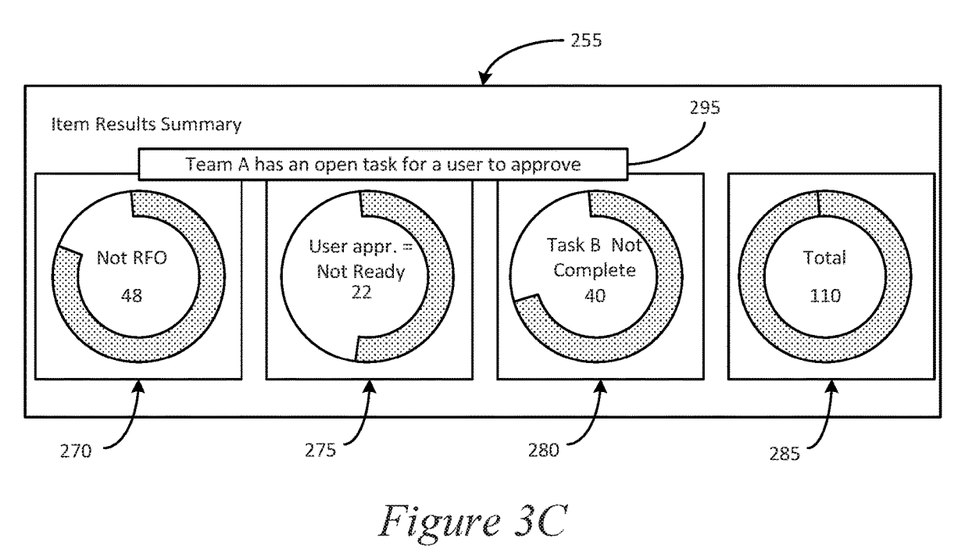
FIG. 3C is a schematic diagram of a portion of a first panel of the GUI in FIG. 3A, according to an embodiment.

FIG. 3C is a schematic of a portion of the first panel 255 (FIG. 3A) including the indicators 270-285, according to an embodiment. It will be appreciated that the text and images shown in the illustrated embodiment are intended as examples and that the text and images can vary according to the principles described in this specification. In the illustrated embodiment, a message 295 is displayed above the indicators 270-285. In an embodiment, the message 295 may be an indication of a task having a relatively high priority.

Figure 3D:
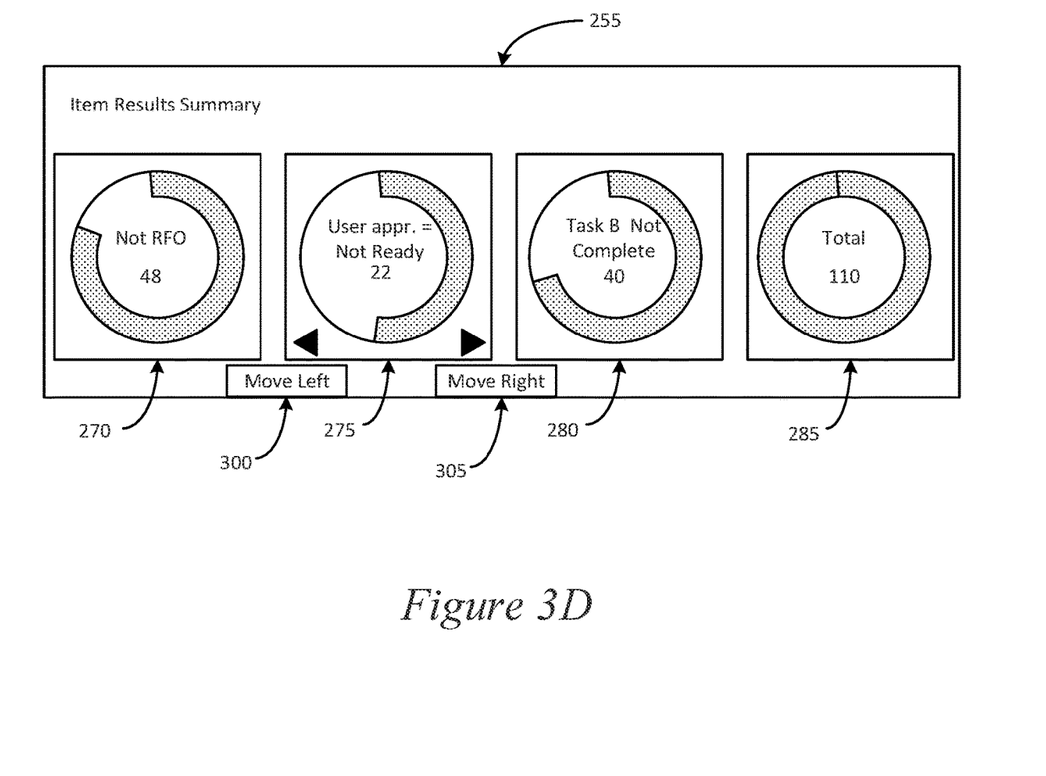
FIG. 3D is a schematic diagram of a portion of a first panel of the GUI in FIG. 3A, according to an embodiment.

FIG. 3D is a schematic of a portion of the first panel 255 (FIG. 3A) including the indicators 270-285, according to an embodiment. It will be appreciated that the text and images shown in the illustrated embodiment are intended as examples and that the text and images can vary according to the principles described in this specification. In the illustrated embodiment, the user may be hovering over the indicator 275. When hovering, rearrange buttons 300, 305 may be automatically displayed on the GUI 250. In FIG. 3D, in addition to arrows, the rearrange buttons 300, 305 include text indicating to the user that she can "Move Left" or "Move Right." If the user chooses, she can move the indicators 270-285 so that they are displayed according to the user's preferences.

It will be appreciated that the features described in accordance with FIGS. 3B-3D can be combined.

With further reference to FIG. 3A, the second panel 260 includes a plurality of columns 310-360. The column 310 may be a checkbox that is selectable by the user. When the checkbox is selected one or more actions may be possible. For example, as shown in FIG. 3E, an option menu 380 may be shown under the selected row(s).

Figure 3E:
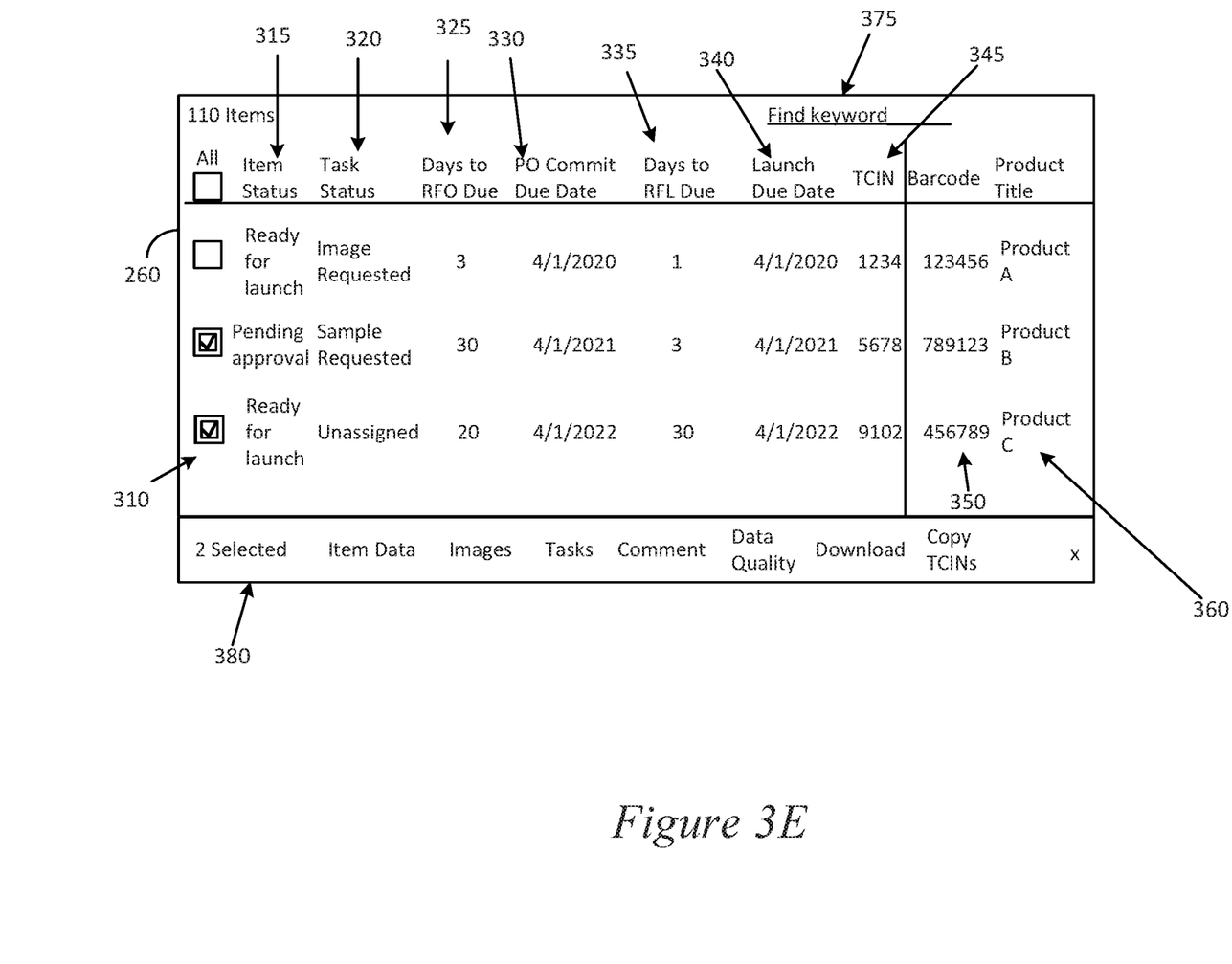
FIG. 3E is a schematic diagram of a portion of the GUI in FIG. 3A showing a search user interface in a multiple selection state, according to an embodiment.

FIG. 3E is a schematic diagram of an example of the GUI 250 showing the search user interface in a multiple update state, according to an embodiment. It will be appreciated that the text and images shown in the illustrated embodiment are intended as examples and that the text and images can vary according to the principles described in this specification. In the embodiment in FIG. 3E, two checkboxes are selected, as indicated in the option menu 380. The option menu 380 can include a variety of options available to the user. The options may generally enable the user to perform tasks related to the electronic management of the item(s) selected.

With further reference to FIG. 3A, each of the rows includes a button 365 to display a menu with additional actions that can be taken on that single item. Additional actions include, but are not limited to, previewing the item, accessing a modal dialog where the user can manage the relationship of that item to other items for purposes of shipping and/or display on the website, or the like.

The columns 315-360 represent item information about each of the items being electronically managed by the user. The item information can be populated based on the information stored in the items database 40 and the rules database 45. For example, the item information can include an item status 315, a task status 320, or the like. It will be appreciated that the item information contained in columns 315-360 can vary according to the principles described in this specification. Further, it will be appreciated that the number of columns 315-360 can vary.

Below the last row in FIG. 3A is a navigation bar 370. The navigation bar 370 can include, for example, an option to show a different page, an indicator as to which range of rows from an entire set of rows is displayed, and an option to display a particular number of rows per page.

The second panel 260 includes a search input 375. In an embodiment, the search input 375 can be used to find one or more keywords within the displayed rows. In an embodiment, the search input 375 can be used to find one or more keywords within all rows, even those not currently displayed.

The third panel 265 includes additional search filter options. The third panel 265 generally includes additional options to help the user further refine what is shown on the GUI 250 to aid the user in increasing a productivity and ease of use when using the electronic product information manager. In the illustrated embodiment, the third panel 265 includes an add filter panel 265A and a current filter panel 265B. Via the add filter panel 265A, a user can add additional criteria to limit a number of items that are shown in the first panel 255 and the second panel 260. For example, the user can filter the items being displayed so that only items that are less than a certain amount of time from a launch due date are displayed.

The current filter panel 265B can show which filters a user may currently have applied to the items shown in the second panel 260. The current filter panel 265B may be optional. For example, if no filters are currently in use, the current filter panel 265B may be hidden from view. The current filter panel 265B includes a listing of the current filters, as well as an option to "Clear All" filters. In an embodiment, each of the filters is selectable and includes an option to delete the filter from use. In this manner, when a plurality of filters is in use, the user can choose to remove one filter or to remove all filters. If the user removes the only filter displayed, or selects the "Clear All" option, then the current filter panel 265B may be removed from the GUI 250.

Figure 4:
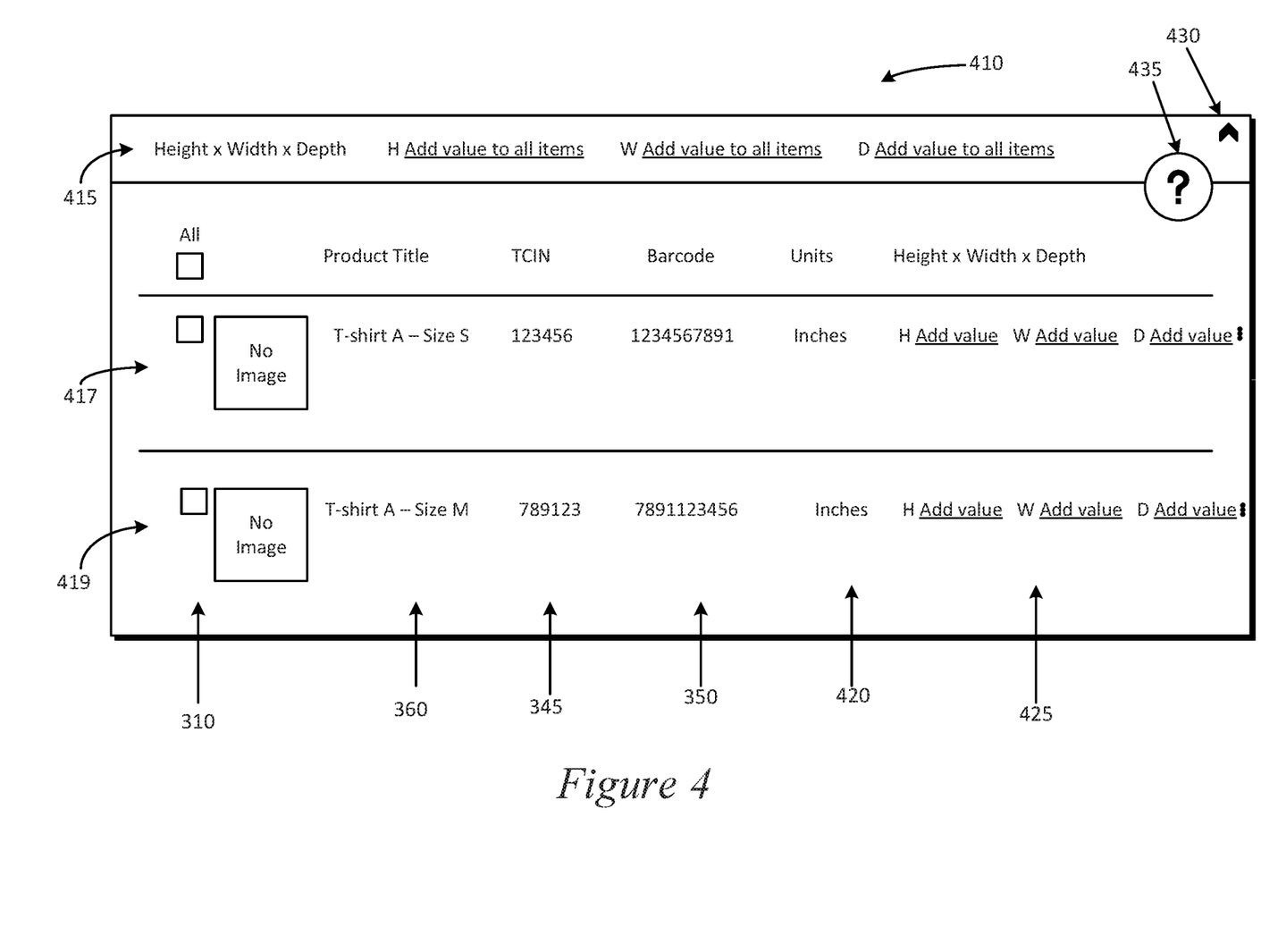
FIG. 4 is a schematic diagram of a GUI for updating a plurality of items in a single entry, according to an embodiment.

FIG. 4 is a schematic diagram of a GUI 410 for updating a plurality of items in a single entry, according to an embodiment. The GUI 410 includes an attribute 415 that may be relevant to a plurality of items 417, 419. It is to be appreciated that a certain number of the columns from FIG. 3A may be included in the GUI 410. Such columns reflect the same reference number as used above. There may be additional columns 420, 425 which are not included in the GUI 250 (FIG. 3A). The columns 420, 425 include additional information about the items 417, 419 displayed on the GUI 410. The attribute 415 may be common to more than one item 417, 419 that are being managed by the user.

For example, in the illustrated embodiment, the attribute 415 may be a height, width, and depth of a package for a clothing item. The clothing item may be sold in multiple sizes, e.g., a small (item 417) or a medium (item 419). Even though the sizes of the items 417, 419 are different, the package dimensions may be the same size for both items 417, 419. In such an instance, the user can enter the package dimensions in the attribute 415, and the attribute 425 for both items 417 and 419 may be populated, validated, and saved. In an embodiment, the package dimensions may be different, in which case the user may enter each dimension in the attribute 425 for each of the items 417, 419. In an embodiment, the user may be able to select a button 430 to alternate between a view that shows the individual items 417, 419 and one that shows the attribute 415 without the individual items 417, 419. In an embodiment, a button 435 may be included so that a user may reach a help GUI or comments about the GUI 410 when the button 435 is selected.

Figure 5:
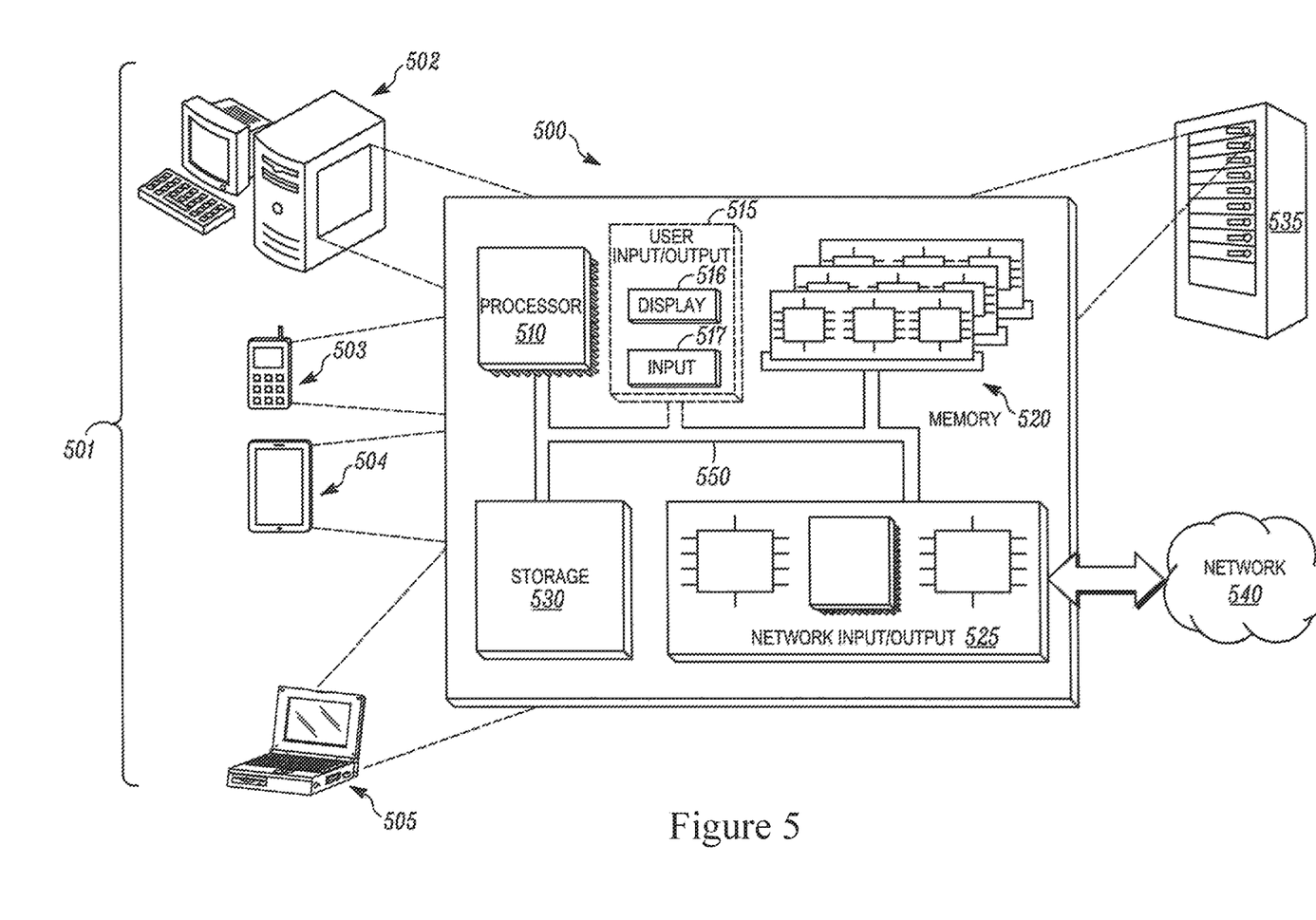
FIG. 5 is a schematic diagram of architecture for a computer device, according to an embodiment.

FIG. 5 is a schematic diagram of architecture for a computer device 500, according to an embodiment. The computer device 500 and any of the individual components thereof can be used for any of the operations described in accordance with any of the computer-implemented methods described herein.

The computer device 500 generally includes a processor 510, memory 520, a network input/output (I/O) 525, storage 530, and an interconnect 550. The computer device 500 can optionally include a user I/O 515, according to some embodiments. The computer device 500 can be in communication with one or more additional computer devices 500 through a network 540.

The computer device 500 is generally representative of hardware aspects of a variety of user devices 501 and a server device 535. The illustrated user devices 501 are examples and are not intended to be limiting. Examples of the user devices 501 include, but are not limited to, a desktop computer 502, a cellular/mobile phone 503, a tablet device 504, and a laptop computer 505. It is to be appreciated that the user devices 501 can include other devices such as, but not limited to, a personal digital assistant (PDA), a video game console, a television, or the like. In some embodiments, the user devices 501 can alternatively be referred to as client devices 501. In such embodiments, the client devices 501 can be in communication with the server device 535 through the network 540. One or more of the client devices 501 can be in communication with another of the client devices 501 through the network 540 in some embodiments.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can be, for example, one or more busses or the like. The processor 510 can be a single processor, multiple processors, or a single processor having multiple processing cores. In some embodiments, the processor 510 can be a single-threaded processor. In some embodiments, the processor 510 can be a multi-threaded processor.

The user I/O 515 can include a display 516 and/or an input 517, according to some embodiments. It is to be appreciated that the user I/O 515 can be one or more devices connected in communication with the computer device 500 that are physically separate from the computer device 500. For example, the display 516 and input 517 for the desktop computer 502 can be connected in communication but be physically separate from the computer device 500. In some embodiments, the display 516 and input 517 can be physically included with the computer device 500 for the desktop computer 502. In some embodiments, the user I/O 515 can physically be part of the user device 501. For example, the cellular/mobile phone 503, the tablet device 504, and the laptop 505 include the display 516 and input 517 that are part of the computer device 500. The server device 535 generally may not include the user I/O 515. In some embodiments, the server device 535 can be connected to the display 516 and input 517.

The display 516 can include any of a variety of display devices suitable for displaying information to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or input means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In some embodiments the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In some embodiments, the memory 520 can be a volatile memory. In some embodiments, the memory 520 can be a non-volatile memory. In some embodiments, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 530 is a computer readable medium. In some embodiments, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In some embodiments, the network I/O 525 can transmit data via the network 540 through a wireless connection using Wi-Fi, Bluetooth, or other similar wireless communication protocols. In some embodiments, the computer device 500 can transmit data via the network 540 through a cellular, 3G, 4G, or other wireless protocol. In some embodiments, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering a website on the user devices 501. The server 535 can be representative of a data server, an application server, an Internet server, or the like.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided to an end-user through a cloud-computing infrastructure. Cloud computing generally includes the provision of scalable computing resources as a service over a network (e.g., the Internet or the like).

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A system comprising:
a graphical user interface (GUI) displayed on a display device, the GUI being configured to electronically manage product information of a plurality of items to be sold by a retailer, the GUI including:
a website that is accessible via a network and is loadable onto a user device having the display device and an input device, and that when loaded onto the user device permits the user device to communicate with at least one server:
to send to the at least one server item information to electronically manage the plurality of items in a product information database, the item information indicating whether a particular item of the plurality of items is available for purchase or is related to another of the plurality of items that is available for purchase,
to receive from the at least one server item information from the product information database, and
to cause display of the item information received from the product information database;

the at least one server remote from the user device on which the website is loaded and that is able to communicate with the user device, the at least one server being configured to receive the item information about the plurality of items from the product information database, update the item information in the product information database, and send the item information to the website, wherein the at least one server includes a hardware processor, a memory, and a non-transitory storage; and a database in electronic communication with the at least one server so that the server provides electronic management of the plurality of items so that each of the plurality of items can be moved from an unavailable status in which a particular item is not available for purchase by a customer of the retailer to an available status in which the particular item is available for purchase by the customer of the retailer, wherein the database including a user information database, the product information database, and a rules database, wherein the user information database includes username and password information for a user as well as user permissions that are based on whether the user is an employee of the retailer or a vendor attempting to sell items via the retailer, the user permissions determine fields of information relating to the plurality of items displayed on the display device via the GUI, wherein the product information database includes an item identification number for each of the plurality of items, a barcode associated with each of the plurality of items, information indicating whether each of the plurality of items is available for purchase or is related to another item of the plurality of items that is available for purchase, identifying information including a brand and title for each of the plurality of items, and a listing of tasks requested or required for moving each of the plurality of items toward purchase, wherein the rules database includes one or more rules relating to the management of the plurality of items in the product information database including one or more validation rules used to ensure that data entered via the GUI using the input device includes proper information, wherein the web site includes a dashboard user interface that displays a plurality of saved searches in a table format, each of the plurality of saved searches including an identifier, a total number of results, and a plurality of statuses including a "ready for launch status", a "not ready for launch status", and a "not ready for order status", wherein each of the plurality of statuses is shown including a percentage of the total number of results corresponding to the status, each of the plurality of statuses is selectable so that the saved search and corresponding status is shown in response to selection of the status, wherein when a saved search of the plurality of saved searches is selected, an item search interface is displayed that displays one or more saved search items of the plurality of items corresponding to the saved search, wherein the item search interface includes a first panel that displays a visual representation of a first subset of the plurality of items having the "ready for launch" status, a second subset of the plurality of items having the "not ready for launch" status, and a third subset of the plurality of items having the "not ready for order" status based on the item information from the product information database, wherein the item search interface includes a second panel that displays a summary of item results based on the user's search, the summary of item results including a plurality of columns representing the item information about each of the plurality of items, wherein the plurality of columns includes an item status column, a task status column, a status due date column, an identification number column, and a product title column, wherein the summary of item results is populated based on information stored in the product information database and the rules database, wherein the at least one server is configured to receive a single entry corresponding to an attribute that applies for at least two of the plurality of items, update the item information to include the attribute for each of the at least two of the plurality of items in the product information database, and send updated item information with the attribute to the website, and wherein the website automatically populates and displays the updated item information with the attribute for each of the at least two of the plurality of items.

2. The system according to claim 1, further comprising a plurality of secondary user devices, wherein when the user device sends the item information to the at least one server, the at least one server sends the item information to a second of the plurality of secondary user devices.

3. The system according to claim 2, wherein when the first of the plurality of user devices sends the item information to the at least one server, a message is automatically sent to the second of the plurality of user devices indicating that a further action is to be taken by the second of the plurality of user devices.

4. The system according to claim 1, wherein the visual representation of the first subset of the plurality of items, the second subset of the plurality of items, and the third subset of the plurality of times are pie chart indicators, and each of the pie chart indicators is selectable to automatically display a subset of items from the plurality of items meeting a filter criteria defined by one of the first subset of the plurality of items, the second subset of the plurality of items and the third subset of the plurality of items.

5. The system according to claim 1, wherein when a cursor of the user device is overlaid on one of the pie chart indicators, a message is automatically displayed on the website including additional information about the one of the pie chart indicators.

6. The system according to claim 1, wherein the dashboard user interface is displayable via a user device that includes a display and an input, and when a cursor corresponding to the input is located over a region surrounding the total number of results for one of the plurality of saved searches, a relocate button and a remove button are automatically displayed.

7. The system according to claim 6, wherein when the relocate button is selected, the one of the plurality of saved searches is movable to a different location of the website.

8. The system according to claim 6, wherein when the remove button is selected, the one of the plurality of saved searches is removed from the website.

9. The Internet website system according to claim 1, wherein the item search interface displays an option to further filter the one or more saved search items being displayed.

10. The Internet website system according to claim 1, wherein each of the one or more-saved search items includes a checkbox to select a particular saved search item of the one or more saved search items for further modification, wherein multiple attributes of the particular saved search item of the one or more saved search items are modifiable using a single entry.

11. The system according to claim 1, wherein the single entry is validated by the at least one server and saved in a memory of the at least one server as the single entry is received.

12. The system according to claim 11, further comprising automatically sending the updated product information from the memory of the at least one server to the product information database.

13. The system according to claim 1, wherein the item search interface includes a third panel that displays a listing of the one or more current filters being applied to the summary of item results shown in the second panel of the item search interface, wherein the third panel includes an add filter panel that is selectable via the user device to add additional criteria to limit the one or more saved search items shown in the second panel, and wherein the third panel also includes a current filter panel that includes the listing of the one or more current filters and a "clear all" filter that is selectable by the user device to remove each of the one or more current filters being applied to the summary of item results shown in the second pane of the item search interface.

14. The system according to claim 1, wherein the task status column includes task information for moving each of the one or more saved search items toward a "ready for order" status.

15. The system according to claim 1, wherein the plurality of columns includes a checkbox column with a checkbox for each of the one or more saved search items, wherein the checkbox for each of the one or more saved search items is selectable to display an option menu with one or more options that enable the user to perform a task related to a particular saved search item of the one or more saved search items associated with the checkbox.

* * * * *